United States Patent
Wu

(10) Patent No.: US 11,062,171 B2
(45) Date of Patent: Jul. 13, 2021

(54) DATA CAPTURING METHOD AND SYSTEM THEREOF

(71) Applicant: Wistron Corp., New Taipei (TW)

(72) Inventor: Gen Kai Wu, New Taipei (TW)

(73) Assignee: WISTRON CORP., New Taipei (TW)

( * ) Notice: Subject to any disclaimer, the term of this patent is extended or adjusted under 35 U.S.C. 154(b) by 84 days.

(21) Appl. No.: 16/432,560

(22) Filed: Jun. 5, 2019

(65) Prior Publication Data

US 2020/0257924 A1 Aug. 13, 2020

(30) Foreign Application Priority Data

Feb. 12, 2019 (CN) .......................... 201910111060.3

(51) Int. Cl.
G06K 9/62 (2006.01)
G06F 16/55 (2019.01)
G06T 7/194 (2017.01)
G06F 16/535 (2019.01)
G06F 16/583 (2019.01)

(52) U.S. Cl.
CPC ......... *G06K 9/6202* (2013.01); *G06F 16/535* (2019.01); *G06F 16/55* (2019.01); *G06F 16/5838* (2019.01); *G06T 7/194* (2017.01)

(58) Field of Classification Search
CPC .... G06F 16/535; G06F 16/55; G06F 16/5838; G06K 9/325; G06K 9/6202; G06T 7/194
See application file for complete search history.

(56) References Cited

U.S. PATENT DOCUMENTS 8,745,524 B2 * 6/2014 Hsu .......................... G06F 3/011
715/786
2012/0051645 A1 * 3/2012 Sun ..................... G06K 9/00402
382/190
2013/0182959 A1 * 7/2013 Thrasher ................. G06T 5/003
382/195

FOREIGN PATENT DOCUMENTS

CN 102385707 A 3/2012
CN 108596180 A 9/2018

OTHER PUBLICATIONS

Wax, David B., Bryan Hill, and Matthew A. Levin. "Ventilator Data Extraction with a Video Display Image Capture and Processing System." Journal of medical systems 41.6 (2017): 101. (Year: 2017).*

* cited by examiner

*Primary Examiner* — Tsung Yin Tsai

(57) ABSTRACT

A data capturing method is provided, which obtains a current image of a target software window according to a handle of the target software window, captures at least one data image from the current image according to at least one target capture area so as to obtain at least one corresponding character image and at least one corresponding representative character from a character image database according to the at least one data image, and outputs the at least one representative character corresponding to the at least one data image, such that the data capturing performing on the target software window would not be affected by the occlusion of other software windows, thereby improving the efficiency of data capturing.

20 Claims, 13 Drawing Sheets

| Handle | Software Window |
|---|---|
| 66398 | WMS ST Notif Window 000012B0 000012B4 |
| 66198 | Battery Indicator |
| 65642 | Start |
| ...... | |
| 131768 | VXS nitro 4500 (Typ) Project NO. RS-0378 |
| ... | |
| 66358 | OfficePowerMannagerWindow |

FIG. 4

DATA CAPTURING METHOD AND SYSTEM THEREOF

CROSS REFERENCE TO RELATED APPLICATIONS

This Application claims priority of China Patent Application No. 201910111060.3, filed on Feb. 12, 2019, the entirety of which is incorporated by reference herein.

BACKGROUND OF THE INVENTION

Field of the Invention

The present invention relates to a technique of data capturing, and in particular it relates to a data capturing method and a system thereof.

Description of the Related Art

With the development of Industry 4.0, data such as status and parameters in a software window of operating equipment all need to be captured in real time and uploaded to a remote server. However, much equipment still does not support real-time data capturing and has no software interface or hardware interface reserved for data capturing.

In order to perform data capturing, equipment generally takes a screenshot of the entire desktop of the equipment's display to directly obtain a screenshot image, and then uses optical character recognition (OCR) software to analyze the screenshot image in order to extract the required data. However, this kind of data capturing often experiences problems of error capture due to the fact that the software window is not maximized or not on the top of the desktop, and so the data capturing and the operation of other software windows cannot be executed simultaneously, thereby impacting the operating efficiency of the equipment.

BRIEF SUMMARY OF THE INVENTION

An embodiment of the present invention provides a data capturing method, including: obtaining a current image of a target software window according to a handle of the target software window; capturing at least one data image from the current image according to at least one target capture area; obtaining at least one character image corresponding to the at least one data image and at least one representative character corresponding to the at least one character image from a character image database according to the at least one data image; and outputting the at least one representative character corresponding to the at least one data image.

Another embodiment of the present invention provides a data capturing system, including a character image database, a processor and a communication device. The character image database is configured to store a plurality of character images. The processor is configured to obtain a current image of a target software window according to a handle of the target software window. Besides, the processor captures at least one data image from the current image according to at least one target capture area, and obtains at least one character image corresponding to the at least one data image and at least one representative character corresponding to the at least one character image from the character image database according to the at least one data image. The communication device is configured to output the at least one representative character corresponding to the at least one data image.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 4 is a diagram illustrating an embodiment of the relationship between window titles of software windows and handles.

DETAILED DESCRIPTION OF THE INVENTION

In order to make the above objects, features and advantages of the embodiments of the present invention easier to understand, a detailed description is given in the following embodiments with reference to the accompanying drawings.

Figure 1:
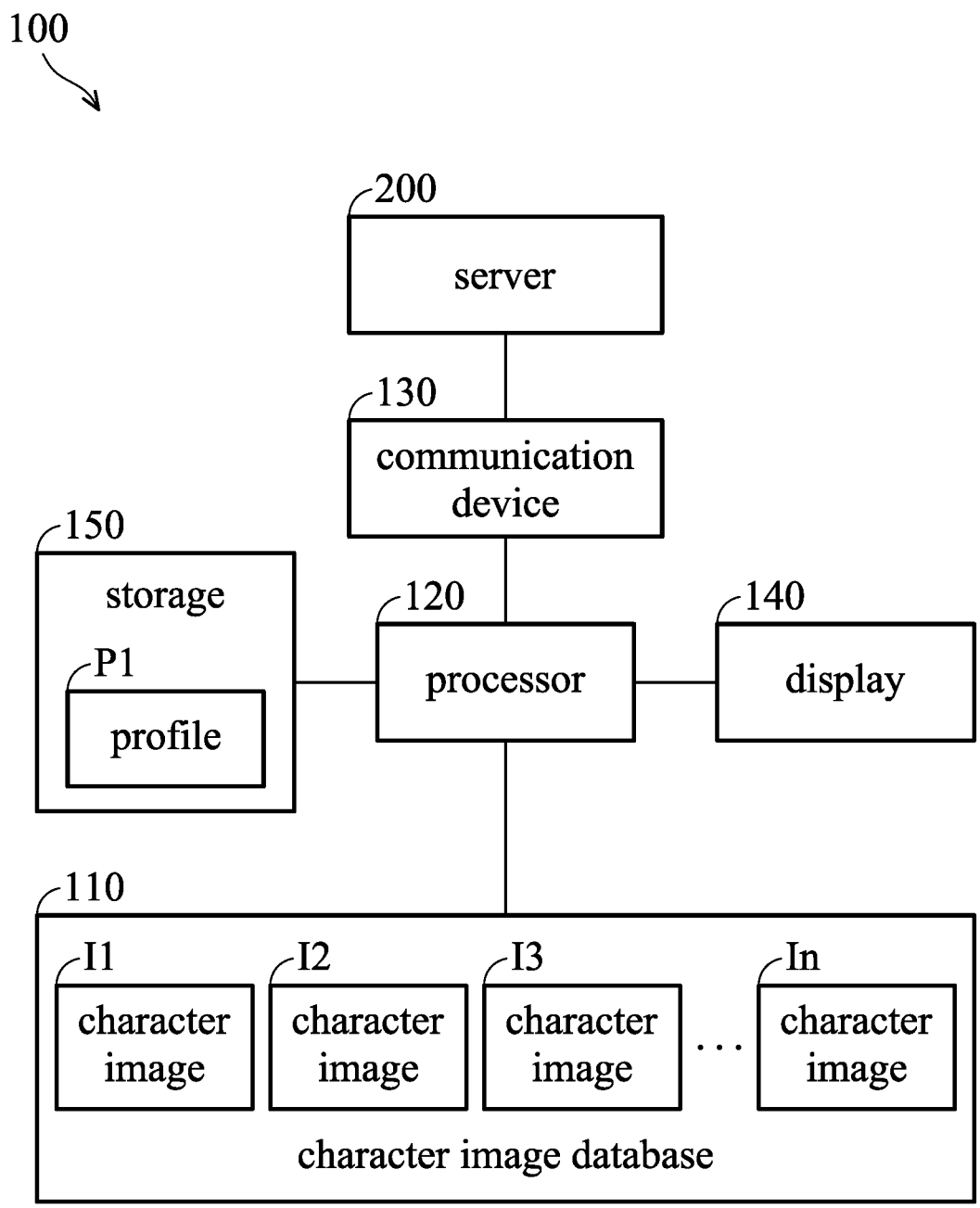
FIG. 1 is a block diagram illustrating an embodiment of data capturing system.
Figure 2:
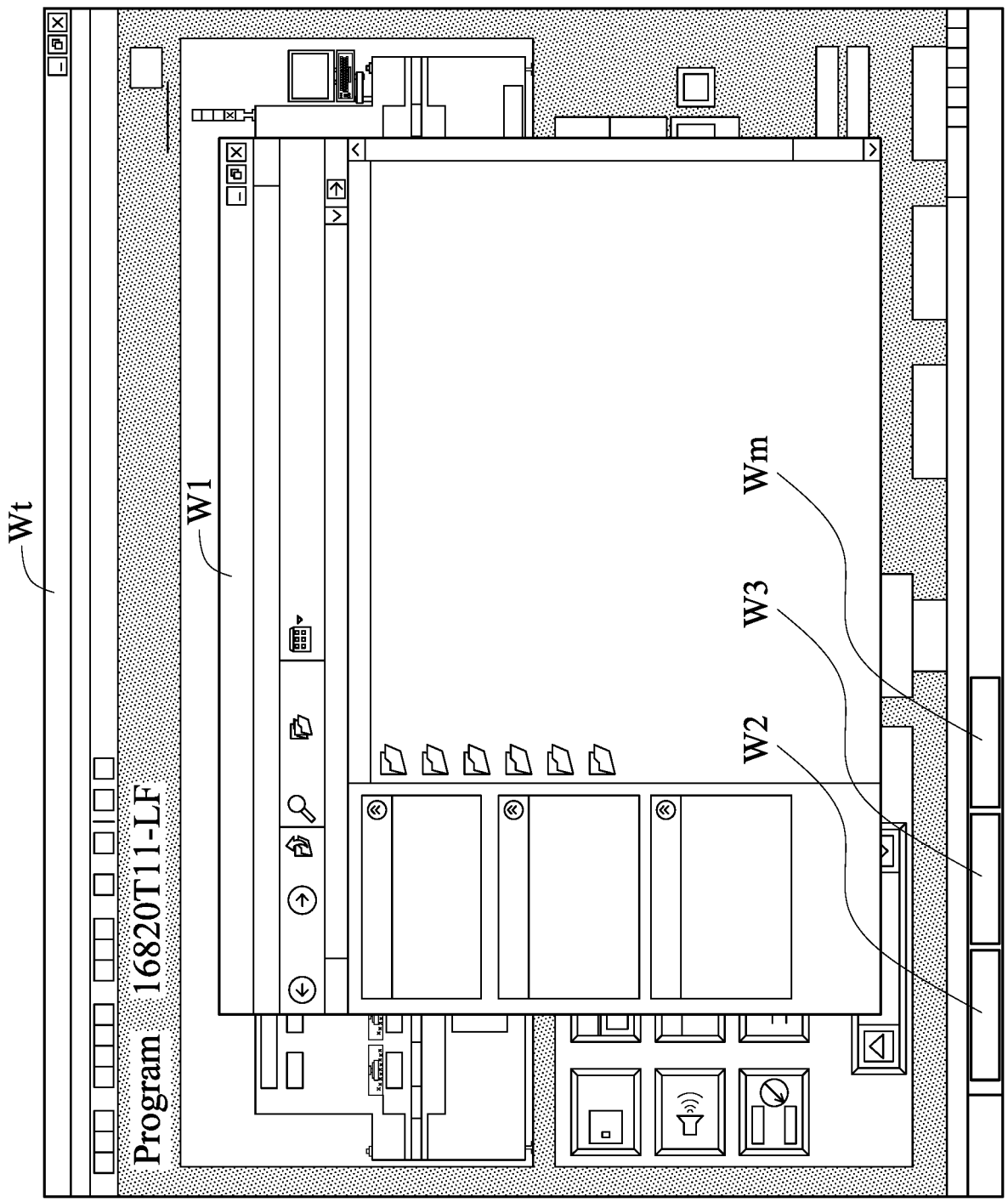
FIG. 2 is a schematic diagram illustrating an embodiment of a display's desktop which displays a plurality of software windows.

FIG. 1 is a block diagram illustrating an embodiment of data capturing system, and FIG. 2 is a schematic diagram illustrating an embodiment of a display's desktop which displays a plurality of software windows. Please refer to FIG. 1 and FIG. 2, a data capturing system 100 can capture required data from a target software window Wt in real time, and transmit the captured data to a server 200 which has been communication coupled to for the advantage of subsequent use of the data.

In one embodiment, the data capturing system 100 may include a character image database 110, a processor 120 and a communication device 130. The processor 120 is coupled to the character image database 110 and the communication device 130. Furthermore, the data capturing system 100 can further includes a display 140, and the display 140 is coupled to the processor 120.

The character image database 110 is configured to store a plurality of character images I1-In, wherein n is a positive integer which is greater than one. Each of character images I1-In includes a single character pattern, and each of character images I1-In has a corresponding representative character for machine reading. Herein, the character pattern can be a number, an English letter or another applicable character or symbol.

In some implementations, each of character images I1-In is a graphic file, such as a PNG (Portable Network Graphics) file, a JPG file, or another suitable graphic file format. Furthermore, each representative character can has a corresponding encoded value depending on the character encoding manner used by the data capturing system 100. In some implementations, the character encoding manner can be ASCII (American Standard Code for information Interchange), Unicode, UTF-8 (8-bit Unicode Transformation Format) or other suitable encoding manners.

The communication device 130 is configured for assisting the processor 120 in communicating with the server 200. In some implementations, the communication device 130 can be a wired network (e.g., Ethernet, optical fiber network or ADSL (Asymmetric Digital Subscriber Line) and so on). While in other implementations, the communication device 130 can also utilize a wireless communication manner (e.g., wireless fidelity technology or other telecommunication network technology) to assist the processor 120 in communicating with the server 200. Therefore, the communication device 130 can be, for example, Bluetooth, Wi-Fi, wireless network or the like.

The display 140 is configured to display screen. Herein, one or multiple software windows W1-Wm can be displayed on the desktop of the display 140. Each of software windows W1-Wm can be displayed on the desktop in a maximized display form, be reduced into the taskbar of the desktop in a minimized display form, or be displayed on the desktop in any size of display form. In some implementations, the display 140 can be a LED (Light-emitting diode) display, LCD (Liquid-crystal display) or other displays suitable for displaying.

The processor 120 can perform data capturing on the target software window Wt according to any one embodiment of a data capturing method in the present invention. In some implementations, the processor 120 can be, for example, SoC (System on Chip), CPU (Central Processing Unit), MCU (Microcontroller), ASIC (Application Specific Integrated Circuit), AP (Application Processor), DSP (Digital Signal Processor) or the like which can include various logic circuits for providing functions of data processing and computing, controlling operation of the communication device 130 to provide network connection, and reading data from a storage 150 or storing data into the storage 150. In particular, the processor 120 is configured to coordinate the operation of the communication device 130, the storage 150 and the character image database 110 for performing the data capturing method of the present application.

Figure 3:
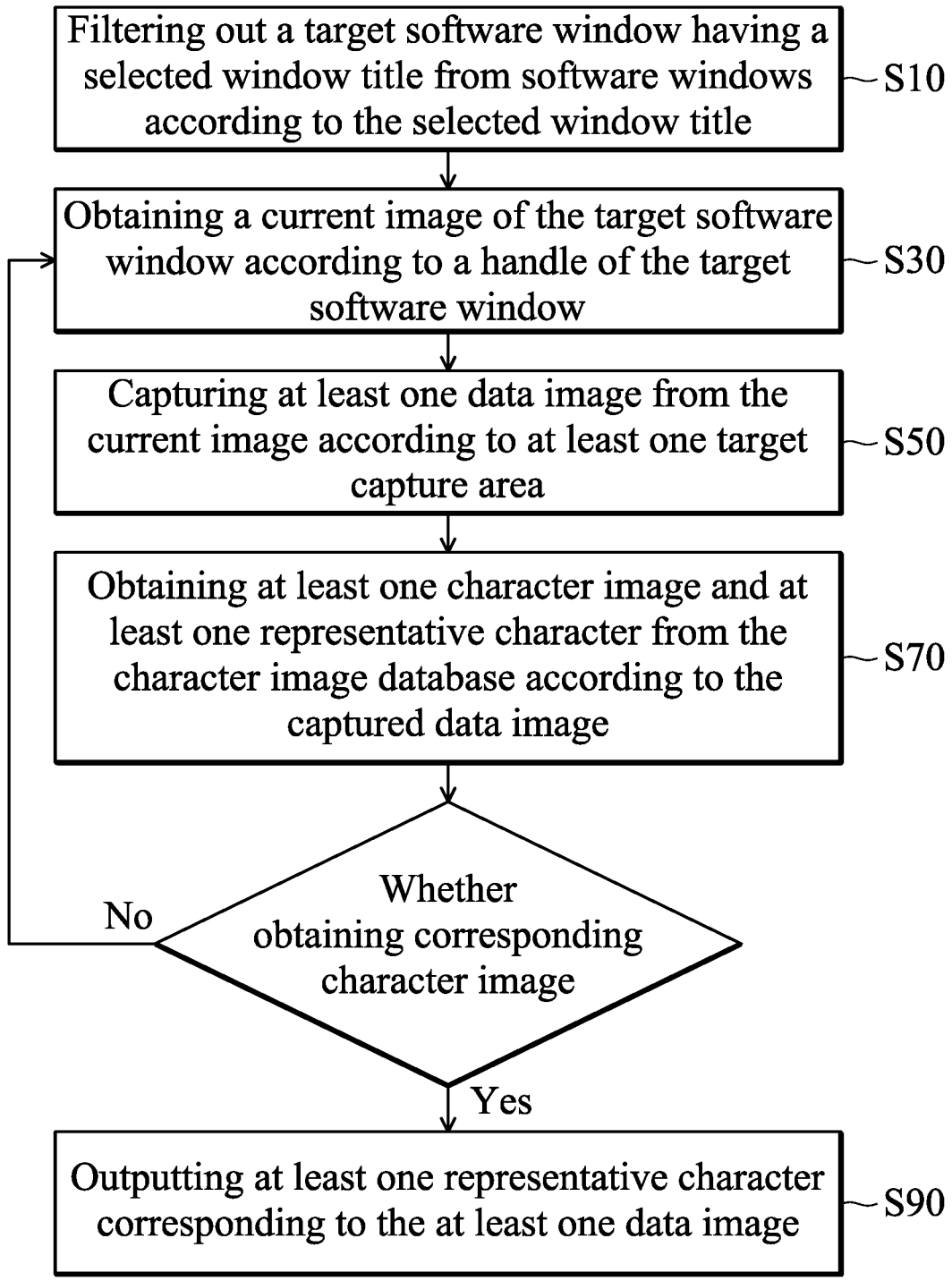
FIG. 3 is a flow diagram illustrating an embodiment of a data capturing method.

FIG. 3 is a flow diagram illustrating an embodiment of a data capturing method. Please refer from FIG. 1 to FIG. 5, in an embodiment of the data capturing method, the processor 120 can filter out a target software window Wt having a selected window title Tt from a plurality of software windows W1-Wm according to the selected window title Tt (step S10). After that, the processor 120 can obtain a current image F1 of the target software window Wt according to a handle Ht of the target software window Wt (step S30). Then, the processor 120 can capture at least one corresponding data image from the current image F1 according to at least one target capture area (step S50), and obtain at least one character image and at least one representative character from the character image database 110 according to the captured data image(s) (step S70). Then, the processor 120 can output the at least one representative character corresponding to the at least one data image through the communication device 130 (step S90). For example, each representative character corresponding to each data image is uploaded to the server 200 through the communication device 130 for the advantage of subsequent use of the data.

In an embodiment of step S10, the processor 120 can obtain all of the software windows W1-Wm in operating by a first extraction function. Herein, each one of the software windows W1-Wm has a corresponding handle. Therefore, the processor 120 can further obtain the handles H1-Hm of these software windows W1-Wm at the time obtained the software windows W1-Wm. Furthermore, the processor 120 can obtain the window titles T1-Tm of these software windows W1-Wm through a second extraction function, and the processor 120 can link the obtained handles H1-Hm and the window titles T1-Tm together according to their corresponding software windows W1-Wm. After that, the processor 120 can use the selected window title Tt selected by user to filter these software windows W1-Wm so as to find out the target software window Wt having the selected window title Tt, and the handle Ht of the target software window Wt can also be found accordingly.

In some embodiments, the first extraction function and the second extraction function can be functions in a DLL (Dynamic Link Library) supported by the operating system. For example, when the operating system is a Microsoft operating system, the first extraction function and the second extraction function can be a GetWindow function and a GetWindowText function respectively in User32.dll (Dynamic Link Library), but the present invention is not limited thereto.

In some embodiments, the data capturing system 100 can further includes storage 150, and the storage 150 is coupled to the processor 120. Furthermore, the processor 120 can store the window titles T1-Tm and the handles H1-Hm in a table form in the storage 150, and the processor 120 can obtain the handle Ht of the target software window Wt by looking up a table according to the selected window title Tt. For example, please refer to FIG. 4, assuming that the selected window title Tt is "VXS nitro 4500 (Typ) Project NO. RS-0378", the processor 120 can obtain that the handle Ht corresponding to the target software window Wt is "131768" from the table by looking up the table. In some implementations, the storage 150 can be realized by one or more storage elements, and each storage element can be but not limit to a non-volatile memory such as ROM (Read Only Memory), hard disk or flash memory etc., or volatile memory such as RAM (Random Access Memory).

In some embodiments, the selected window title Tt can be previously set in a profile P1 by the user such that the processor 120 can obtain the selected window title Tt by reading the profile P1. Moreover, the profile P1 can be stored in the storage 150, but the present invention is not limited thereto.

Figure 5:
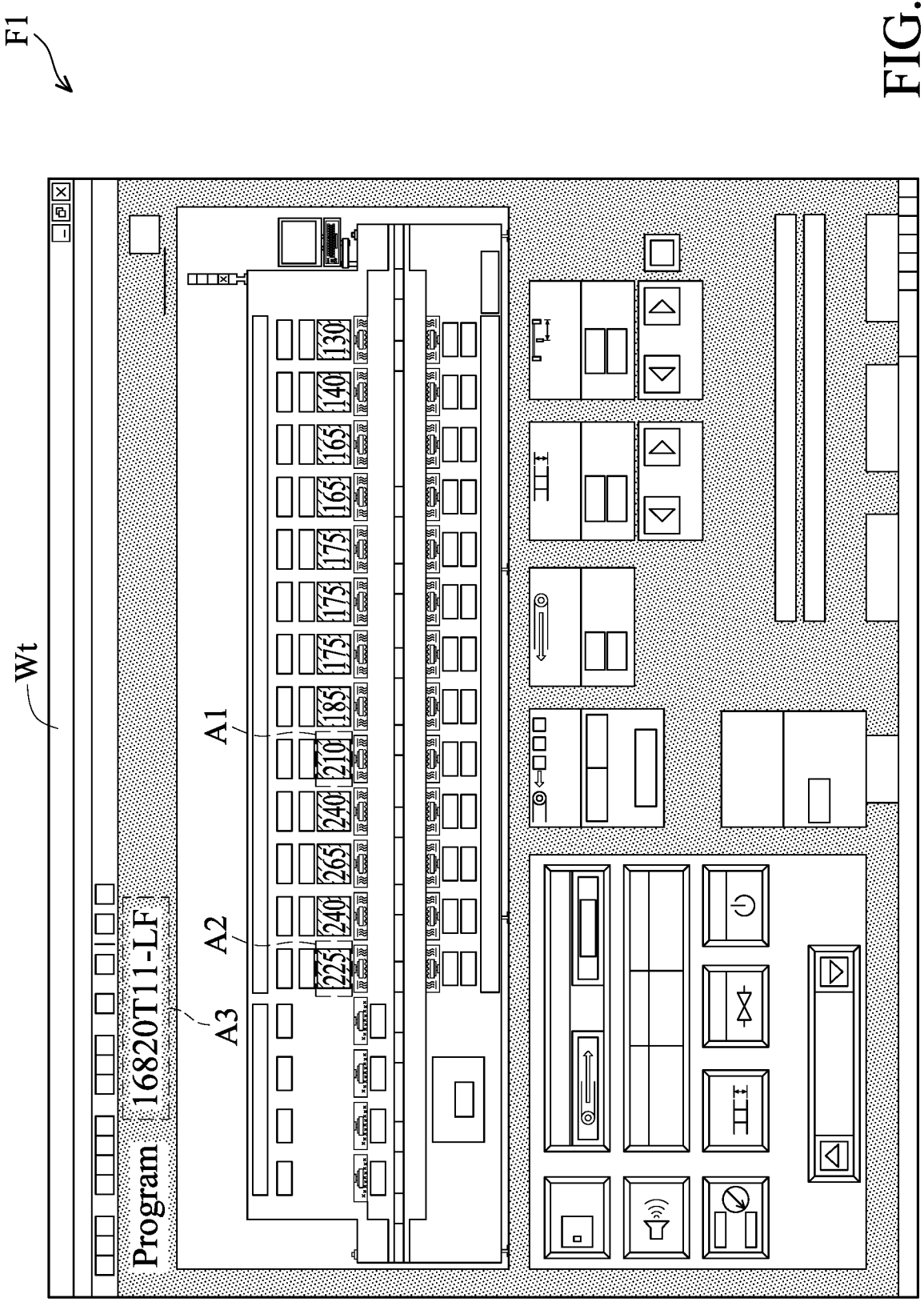
FIG. 5 is a schematic diagram illustrating an embodiment of a current image.

In an embodiment of step S30, the processor 120 can obtain the current image F1 of the target software window Wt according to the handle Ht by using a third extraction function. Wherein, the current image F1 can include the whole target software window Wt, as shown in FIG. 5. Herein, regardless of whether the target software window Wt is displayed on the topmost layer of the desktop of the display 140 or not, the third extraction function can still obtain the current image F1 of the target software window Wt, and the obtained current image F1 can include the target software window Wt only. In this way, the data capturing performed on the target software window Wt is no longer affected by the occlusion of other software windows (i.e., the target software window Wt is not displayed on the topmost layer of the desktop in current).

In some implementations, in response to the operating system being Microsoft operating system, the third extraction function can be a PrintWindow function in User32.dll, but the present invention is not limited thereto.

In an embodiment of step S50, the target capture area can be previously set in the profile P1, and by reading the profile P1, the processor 120 can capture corresponding data image from the current image F 1 according to the target capture area. Hereinafter, three target capture areas A1-A3 are given, and description is made by taking three corresponding data images D1-D3 captured from the current image F1 by the processor 120 as an example, but the number is not used to limit the present invention.

In some embodiments, user can set the target capture areas A1-A3 by separately framing out the ranges of the target capture areas A1-A3 on the target software window Wt previously. Furthermore, after framing out the ranges, corresponding coordinates of each of the target capture areas A1-A3 in the target software window Wt can be stored in the profile P1, but the present invention is not limited thereto. In other embodiments, the user can also set the target capture areas A1-A3 in the profile P1 in a manner of typing the corresponding coordinates of four corners of each of the target capture areas A1-A3 in the target software window Wt into the profile.

Figure 6:
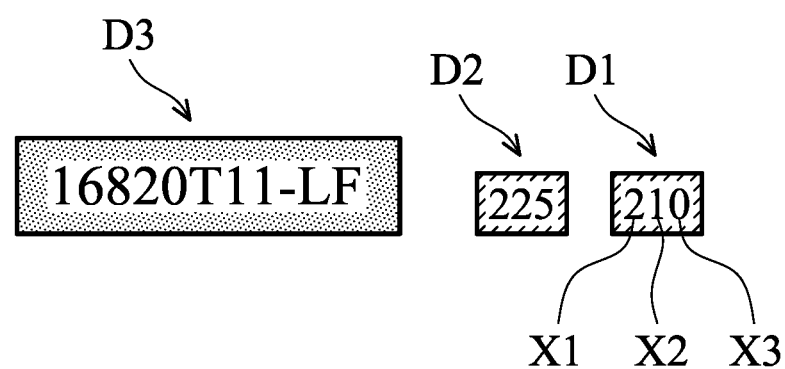
FIG. 6 is a schematic diagram illustrating an embodiment of data images which are captured from the current image in FIG. 5.

In some embodiments, each of the data images D1-D3 captured in step S50 can respectively include at least one character to be tested, and the at least one character to be tested is arranged in a single row, as shown in FIG. 6. In other words, the range of each of the target capture areas A1-A3 can only include single-row characters, as shown in FIG. 5. Hereinafter, description is made by taking the data image D1 which includes three characters to be tested X1-X3 as an example, but the number is not used to limit the present invention. Moreover, for the sake of brevity, the following only uses the data image D1 to explain, but the processing manner performed on the remained data images D2 and D3 can be referred to the processing manner performed on the data image D1.

Figure 7:
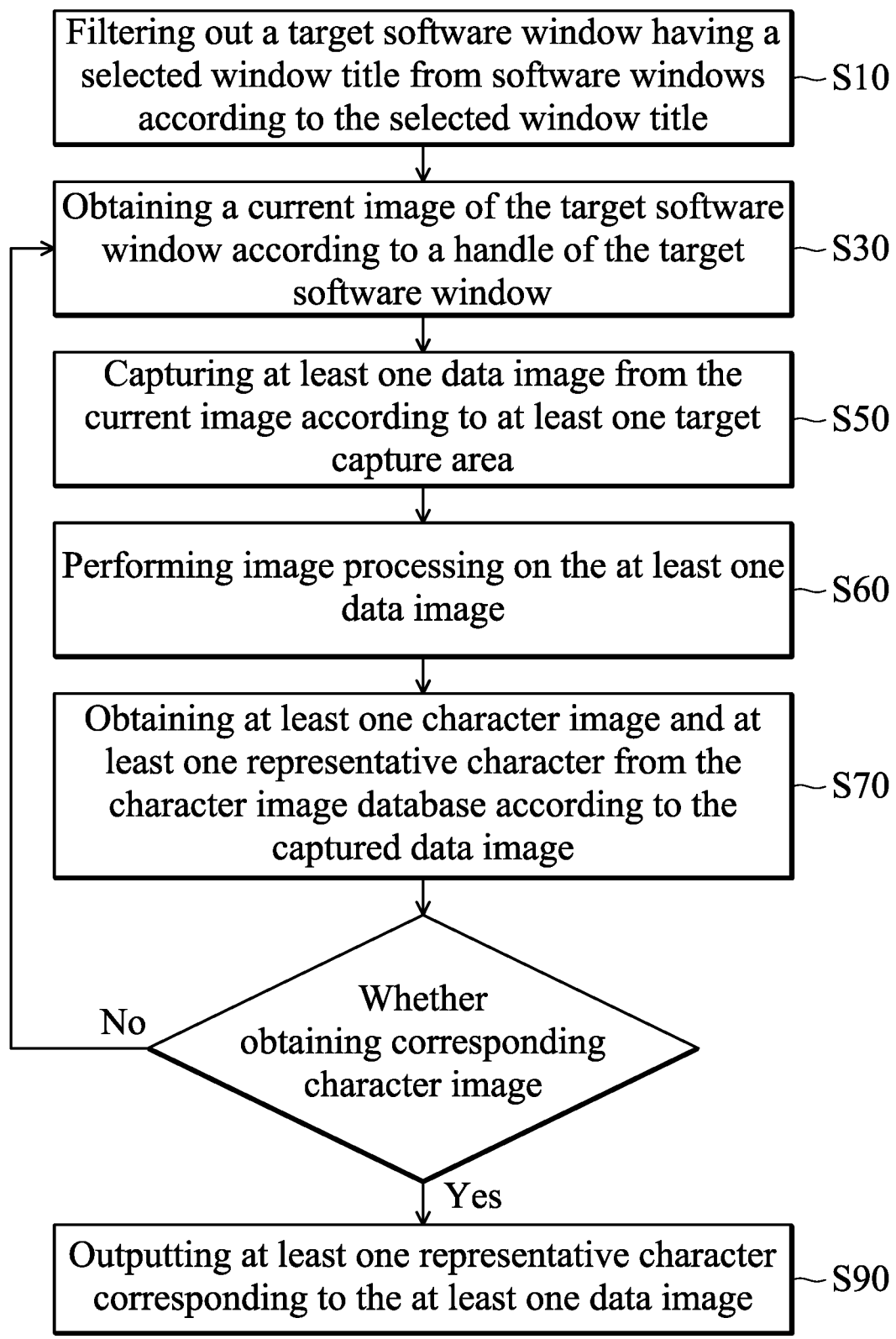
FIG. 7 is a flow diagram illustrating another embodiment of a data capturing method.

FIG. 7 is a flow diagram illustrating another embodiment of a data capturing method. Please refer from FIG. 1 to FIG. 7, in an embodiment of the data capturing method, before the execution of step S70, the processor 120 can further perform image processing on each of the data images D1-D3 (step S60) to facilitate the analytical processing in step S70.

Figure 8:
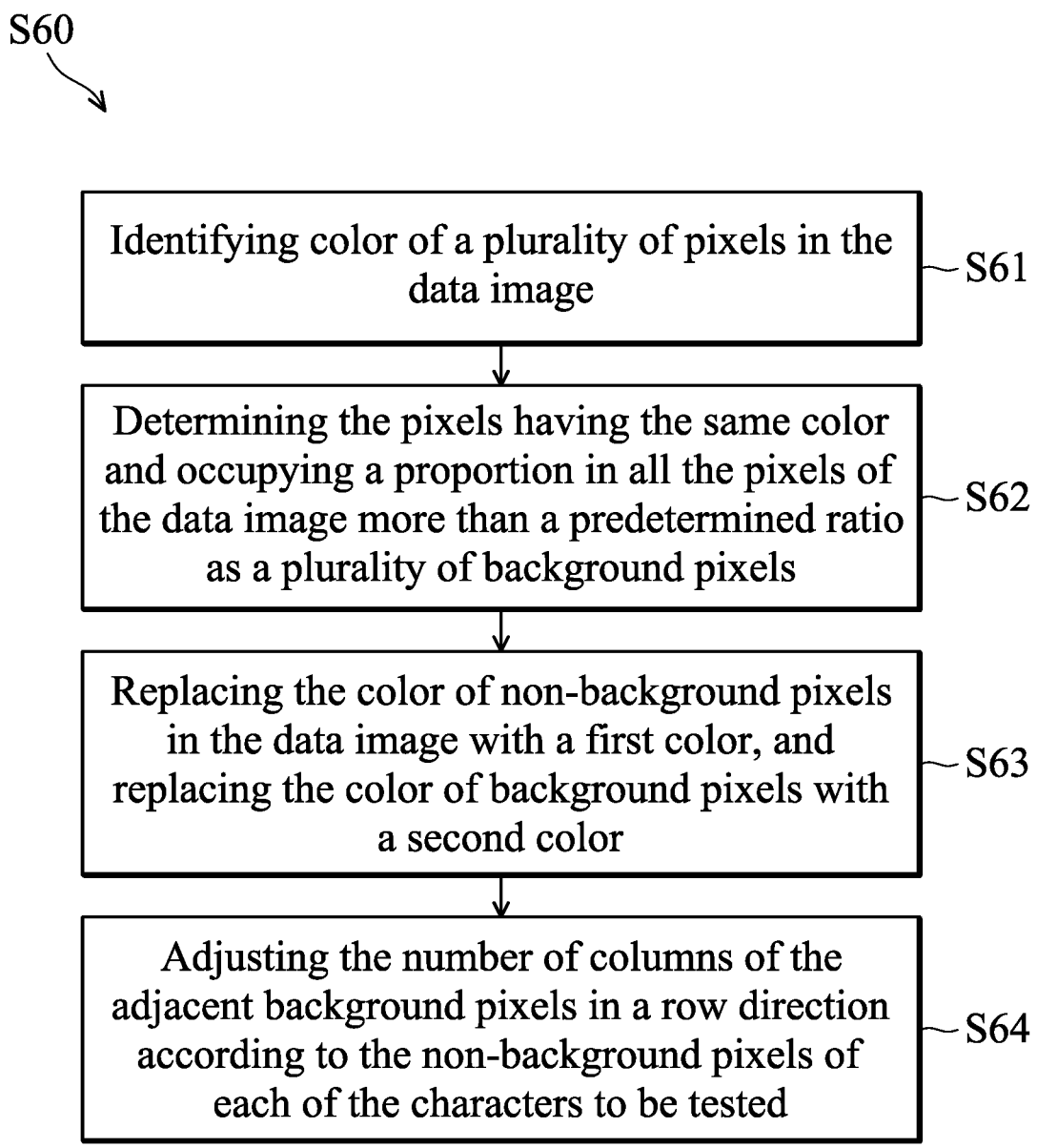
FIG. 8 is a flow diagram illustrating an embodiment of step S60 in FIG. 7.

FIG. 8 is a flow diagram illustrating an embodiment of step S60 in FIG. 7. Please refer from FIG. 1 to FIG. 8, in an embodiment of step S60, the data image D1 may include a plurality of pixels arranged in a matrix pattern, and the processor 120 perform color-recognizing on the plurality of pixels of the data image D1 so as to identify the color displayed by each pixel (step S61). Moreover, the processor 120 can count the number of pixels covered by each color, and determine the pixels having the same color and occupying a proportion in all the pixels of the data image D1 more than a predetermined ratio as a plurality of background pixels (step S62). Then, the processor 120 can replace the color of the pixels other than the background pixels (hereinafter referred to as non-background pixels) in the data image D1 with a first color, and replace the color of the background pixels in the data image D1 with a second color (step S63). Herein, these non-background pixels after completing the color replacement are pixels for displaying the characters to be tested X1-X3. After that, the processor 120 can adjust the number of columns of the background pixels which are adjacent to the non-background pixels in a row direction C1 according to the non-background pixels of each of the characters to be tested X1-X3 (step S64), so as to make the subsequent analytical processing (step S70) can be performed more smoothly. Herein, the row is in the horizontal direction, the column is in the vertical direction, and the number of columns is the number of pixel arranged in the row direction C1.

In an embodiment of step S61, the processor 120 can identify the color of each pixel in the data image D1 by using an interface function, for example, GetPixel function.

In an embodiment of step S62, the predetermined ratio can be but not limit to 50%. Under this situation, the processor 120 can determine those pixels having the same color and occupying the proportion in all the pixels of the data image D1 more than 50% as the background pixels for displaying the background color. Moreover, the processor 120 can determine the remained pixels in the data image as the non-background pixels for displaying the characters to be tested X1-X3.

Figure 9:
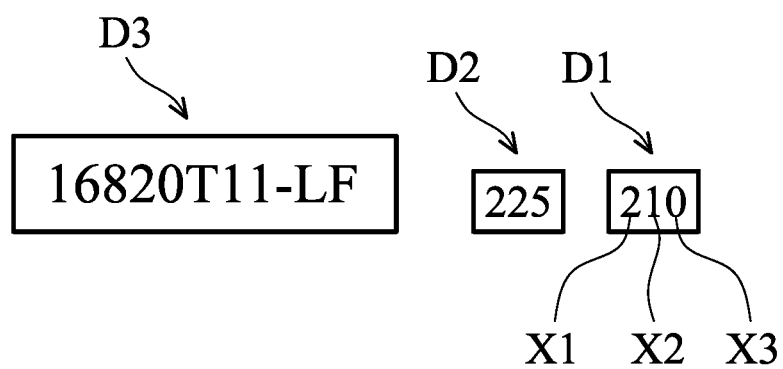
FIG. 9 is a schematic diagram illustrating an embodiment of the data images in FIG. 6 after replacing the color.

In an embodiment of step S63, the first color can be black and the second color can be white, therefore, after performing step S63, the data image D1 would be changed to display the characters to be tested X1-X3 in a form of black text on white background, as shown in FIG. 9. However, the present invention is not limited thereto, the first color and the second color can be any two different colors. In some embodiments, the first color and the second color can be selected based on the color form that each one of character images I1-In in the character image database 110 used to display the character.

In an embodiment of step S64, the processor 120 can perform width normalization on each of the characters to be tested X1-X3 such that the total number of columns of non-background pixels of each of the characters to be tested X1-X3 and columns of the adjacent background pixels can equal a first preset column number.

Figure 10:
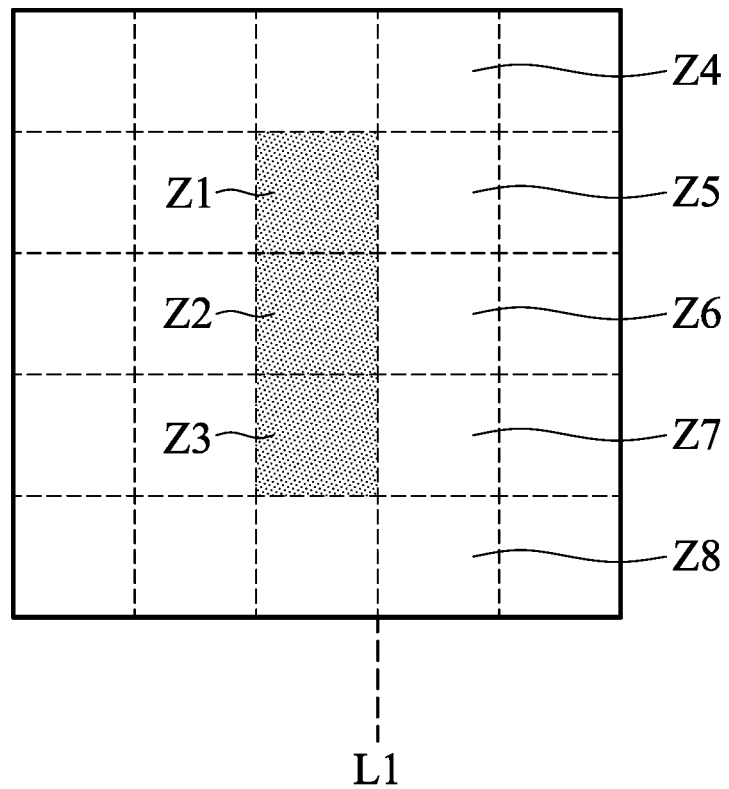
FIG. 10 is a schematic diagram illustrating an embodiment to confirm an end boundary line.

In some embodiments, the processor 120 can utilize an interface function, for example, GetPixel function to identify the color of each pixel in data image D1, so as to find out the position where the non-background pixels with the first color are located. After that, by using a characteristic that the occupied positions of the general characters are independent and not interspersed with each other, the processor 120 further confirms whether each non-background pixel in the same column and the adjacent Y pixels in its right column are all background pixels or not, so as to find out end boundary lines L11, L21 and L31 of the respective characters to be tested X1-X3. Wherein, these Y pixels are located in the same column, and Y is a positive integer greater than 2. For example, as shown in FIG. 10, it is assumed that there are three non-background pixels Z1-Z3 are included in a certain column, the processor 120 may firstly confirm whether three adjacent pixels Z4-Z6 (assuming Y is equal to 3) in a column at the right side of the non-background pixel Z1 are all background pixels or not. At the time that pixels Z4-Z6 are all determined as background pixels, the processor 120 then confirms whether three adjacent pixels Z5-Z7 in the column at the right side of the non-background pixel Z2 are also all background pixels. After confirming that pixels Z5-Z7 are also background pixels, the processor 120 then further confirms whether three adjacent pixels Z6-Z8 in the column at the right side of the non-background pixel Z3 are also all background pixels. At the time that pixels Z6-Z8 are also all determined as background pixels by the processor 120, it means that the non-background pixels Z1-Z3 are end position of the character to be tested and an end boundary line L1 is located between the non-background pixels Z1-Z3 and the pixels Z4-Z8.

As a result, after finding the end boundary lines L11, L21 and L31 of the respective characters to be tested X1-X3, the processor 120 can respectively use the end boundary lines L11, L21 and L31 as a boundary to calculate the number of columns which are occupied by the non-background pixels of each of the characters to be tested X1-X3 according to the result obtained by the previously used interface function, for example, the GetPixel function. In an embodiment, please refer to FIG. 11, the processor 120 can calculate the number of columns which are occupied by the non-background pixels of each of the characters to be tested X1-X3 by finding out starting boundary lines L12, L22 and L32 of the respective characters to be tested X1-X3. For example, the processor 120 can find out the starting boundary lines L12, L22 and L32 of the respective characters to be tested X1-X3 by confirming whether each non-background pixel in the same column and adjacent Y pixels in a column at its left side are all background pixels or not. Then, the processor 120 can obtain a number V11 of columns occupied by the character to be tested X1 according to the columns of the pixels located between the end boundary line L11 and the starting boundary line L12, obtain a number V21 of columns occupied by the character to be tested X2 according to the columns of the pixels located between the end boundary line L21 and the starting boundary line L22, and obtain a number V31 of columns occupied by the character to be tested X3 according to the columns of the pixels located between the end boundary line L31 and the starting boundary line L32.

Finally, on a basis of each of the characters to be tested X1-X3, the processor 120 can adjust the number of columns of these background pixels adjacent to each of the end boundary lines L11, L21, and L31 of the respective characters to be tested X1-X3 and the number of columns of these background pixels adjacent to each of the starting boundary lines L12, L22 and L32 of the respective characters to be tested X1-X3 in a manner of filling or deleting. For example, it is assumed that the number V11 of columns occupied by the character to be tested X1 is 8 and the first preset column number is 20, the processor 120 can respectively adjust a number V12 of columns of the background pixels which are adjacent to the side of the end boundary line L11 and a number V13 of columns of the background pixels which are adjacent to the side of the starting boundary line L12 to be 6, so as that the non-background pixels of the character to be tested X1 could nearly be located in the middle of these adjacent background pixels. For another example, it is assumed that the number V11 of columns occupied by the character to be tested X1 is 9 and the first preset column number is 20, the processor 120 can adjust a number V12 of columns of the background pixels which are adjacent to the side of the end boundary line L11 and a number V13 of columns of the background pixels which are adjacent to the side of the starting boundary line L12 to be 5 and 6 or 6 and 5 respectively, so as that the non-background pixels of the character to be tested X1 could nearly be located in the middle of these adjacent background pixels, but the present invention is not limited thereto.

Figure 11:
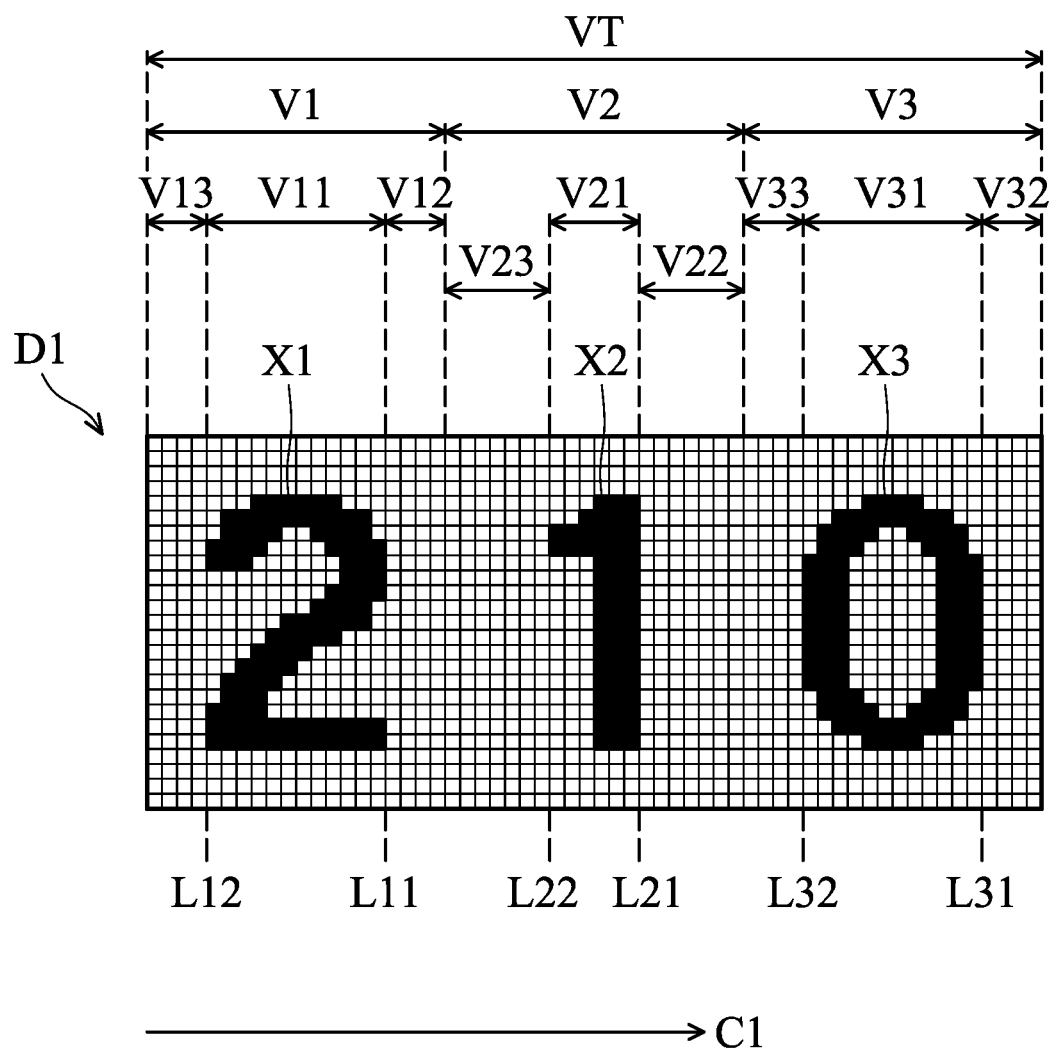
FIG. 11 is a schematic diagram illustrating an embodiment of a data image after image processing.

In some embodiments, a total number V1 of the number V11 of columns of non-background pixels of the character to be tested X1, the number V12 of columns of the background pixels adjacent to the side of the end boundary line L11 and the number V13 of columns of the background pixels adjacent to the side of the starting boundary line L12 is equal to the first preset column number. A total number V2 of the number V21 of columns of non-background pixels of the character to be tested X2, the number V22 of columns of the background pixels adjacent to the side of the end boundary line L21 and the number V23 of columns of the background pixels adjacent to the side of the starting boundary line L22 is equal to the first preset column number. A total number V3 of the number V31 of columns of non-background pixels of the character to be tested X3, the number V32 of columns of the background pixels adjacent to the side of the end boundary line L31 and the number V33 of columns of the background pixels adjacent to the side of the starting boundary line L32 is equal to the first preset column number. A total column number VT of the data image D1 is equal to a product of the number of characters to be tested X1-X3 and the first preset column number, as shown in FIG. 11. For example, the total column number VT of the data image D1 can be 60 (20*3) in response to the first preset column number being 20. However, the present invention is not limited thereto, the value of the first preset column number can be freely designed according to the actual size of each character to be tested.

Figure 12:
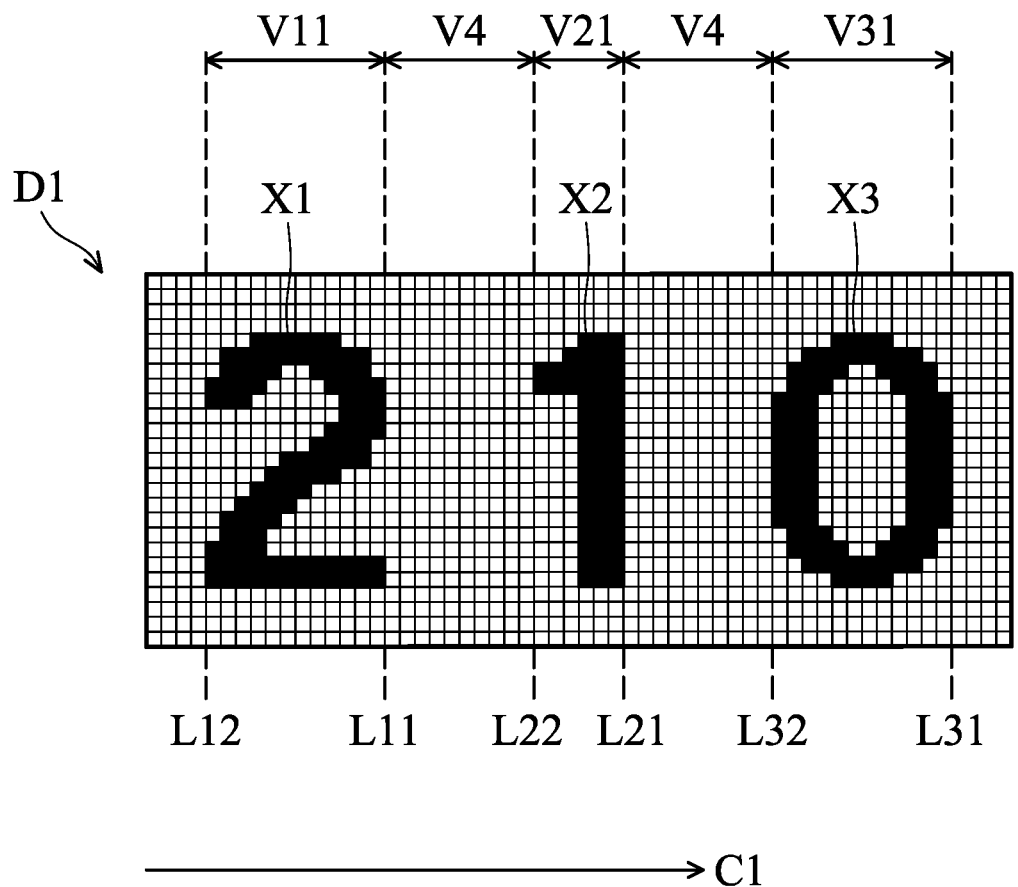
FIG. 12 is a schematic diagram illustrating another embodiment of the data image after image processing.

In another embodiment of step S64, the processor 120 can perform spacing normalization on each of the characters to be tested X1-X3 such that the non-background pixels of each of the characters to be tested X1-X3 and the non-background pixels of another adjacent character to be tested are separated by the background pixels having a second preset column number in the row direction C1. In some embodiments, the processor 120 can firstly determine out the end boundary lines L11, L21 and L31 and the starting boundary lines L12, L22 and L32 of the respective characters to be tested X1-X3. Then, the processor 120, according to the end boundary lines L11, L21 and L31 of the respective characters to be tested X1-X3 and the starting boundary line of the adjacent character, adjusts the number of columns of the background pixels which are located between. For example, the processor 120 can adjust the number of columns of the background pixels which are located between the end boundary line L11 of the character to be tested X1 and the starting boundary line L22 of the character to be tested X2 to the second preset column number V4 according to the end boundary line L11 and the starting boundary line L22, and adjust the number of columns of the background pixels which are located between the end boundary line L21 of the character to be tested X2 and the starting boundary line L32 of the character to be tested X3 to the second preset column number V4 according to the end boundary line L21 and the starting boundary line L32, as shown in FIG. 12. In some implementations, the second preset column number V4 can be 10, but the present invention is not limited thereto, the second preset column number V4 can be freely designed as desired.

Figure 13:
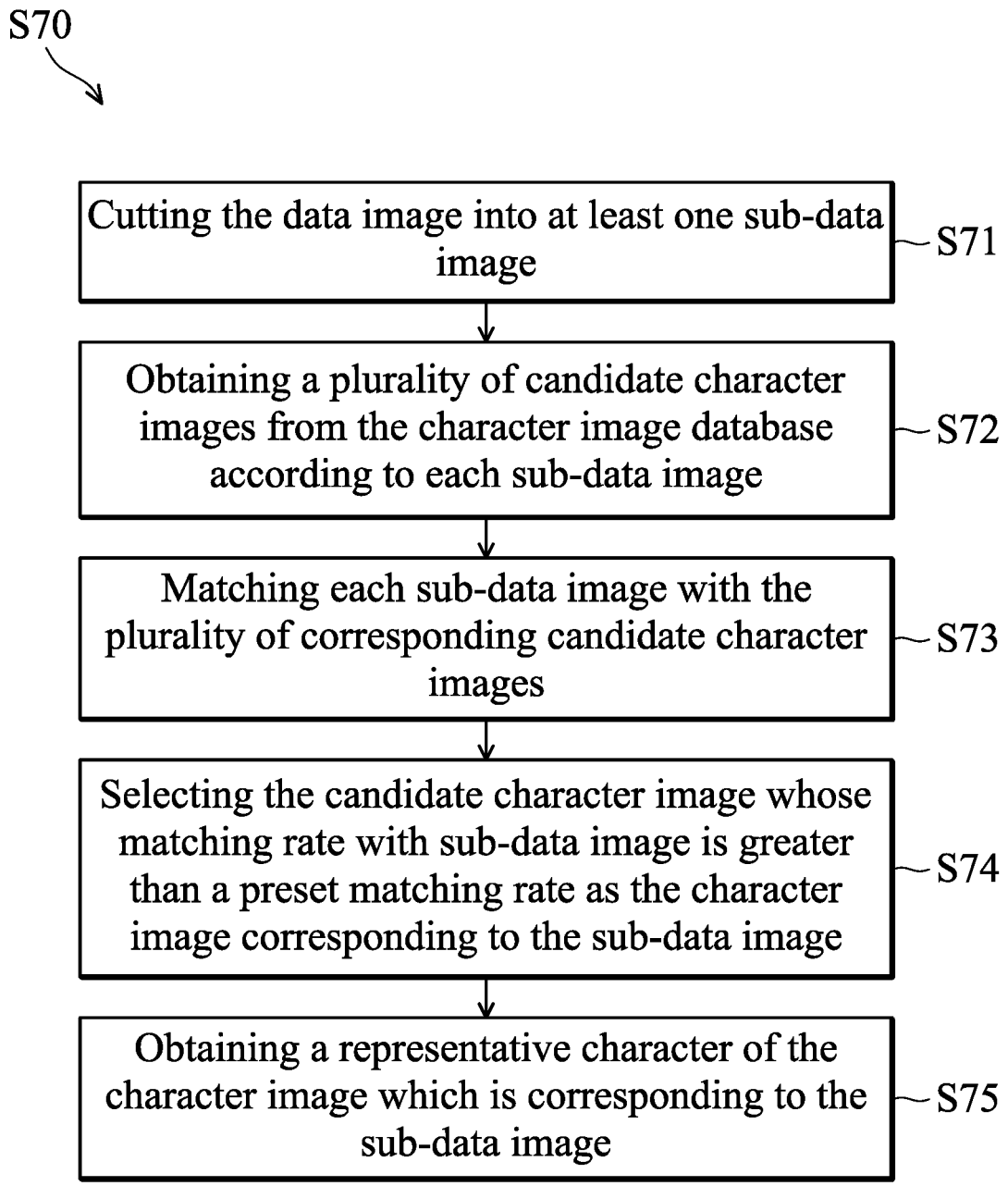
FIG. 13 is a flow diagram illustrating an embodiment of step S70.

FIG. 13 is a flow diagram illustrating an embodiment of step S70. Please refer from FIG. 1 to FIG. 13, in an embodiment of step S70, the processor 120 can cut the data image D1 into at least one sub-data image (step S71). After that, the processor 120 respectively obtains a plurality of candidate character images from the character image database according to each sub-data image (step S72), and matches each sub-data image with the corresponding plurality of candidate character images (step S73). Then, the processor 120 can select the candidate character image whose matching rate with this sub-data image is greater than a preset matching rate as the character image corresponding to this sub-data image (step S74), and obtain a representative character of the character image which is corresponding to this sub-data image (step S75).

Figure 14:
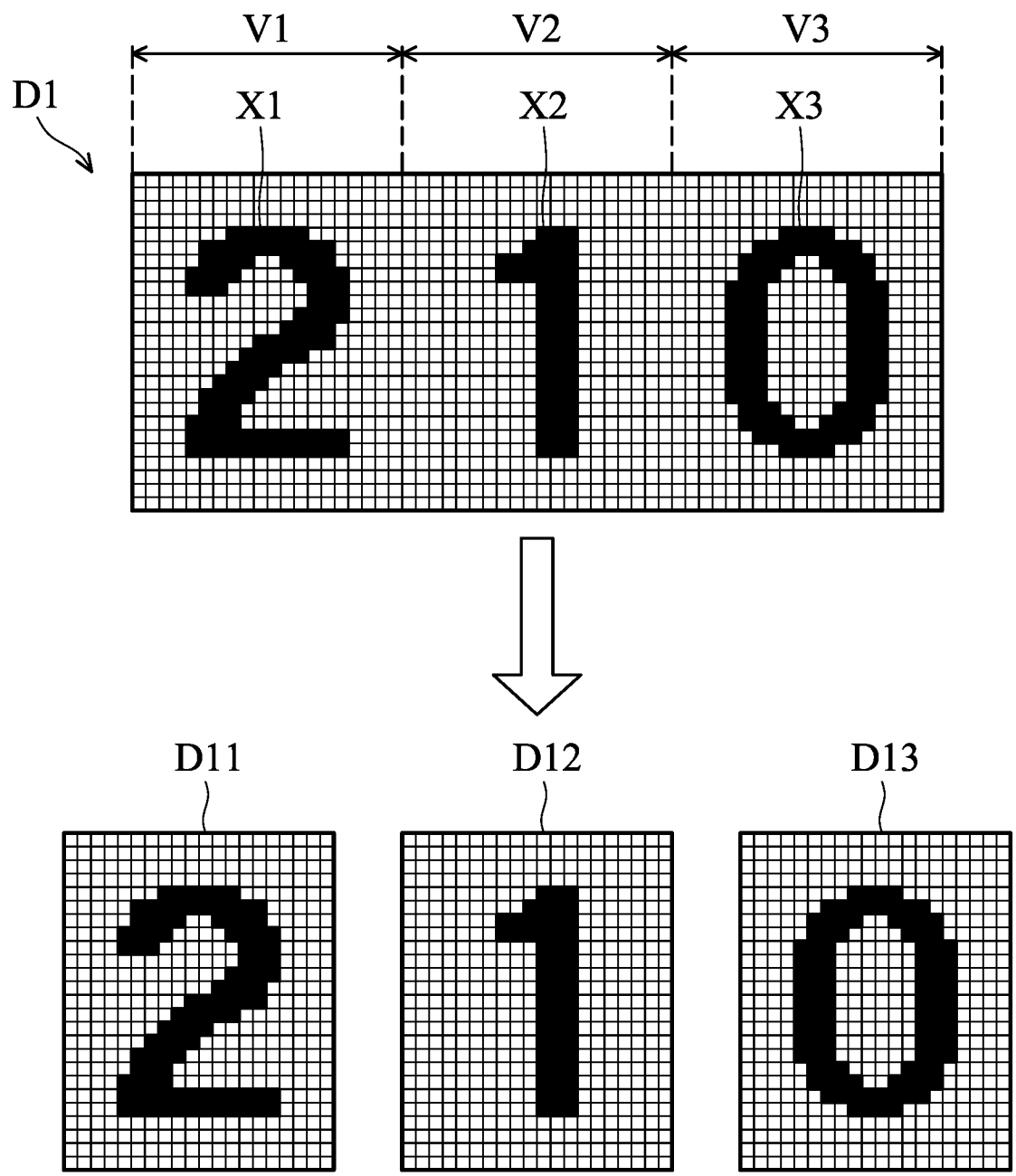
FIG. 14 a schematic diagram illustrating an embodiment to cut the data image into at least one sub-data image.

In an embodiment of step S71, the processor 120 can cut the data image D1 according to a predetermined width to obtain the sub-data image, and each sub-data image includes one character to be tested. Herein, the processor 120 can cut the data image D1 into three sub-data images D11-D13 since the data image D1 includes three characters to be tested X1-X3, as shown in FIG. 14. In some embodiments, the predetermined width can be equal to the first preset column number, but the present invention is not limited thereto.

For the sake of brevity, the following only uses the sub-data image D11 to explain, but the processing manner performed on the remained sub-data images D12 and D13 can be referred to the processing manner performed on the sub-data image D11.

In an embodiment of step S72, the processor 120 can count the number of these non-background pixels whose color are the first color in the sub-data image D11 so as to obtain a first pixel number. Herein, each of the character images I1-In in the character image database 110, according to the character pattern displayed thereon, has a second pixel number of non-background pixels respectively. Therefore, the processor 120 can compare the first pixel number with the second pixel number of each of the character images I1-In to initially filter out a plurality of candidate character images which are close to the sub-data image D11. Moreover, the processor 120 can select the character images whose difference ratio between the first pixel number and the second pixel number falls within a range as the candidate character images of this sub-data image D11. In some embodiments, the processor 120 can calculate a difference between the second pixel number of each of the character images I1-In and the first pixel number respectively, and then the processor 120 divides each obtained difference by the corresponding second pixel number so as to obtain a difference ratio between each of the character images I1-In and the sub-data image D11. However, the present invention is not limited thereto, in other embodiments, the processor 120 also can divides each obtained difference by a total pixel number of corresponding character image respectively so as to obtain the difference ratio between each of the character images I1-In and the sub-data image D11. In still other embodiments, the processor 120 can further calculate a total difference between the total pixel number of each of the character images I1-In and a total pixel number of sub-data image D11 so as to obtain the difference ratio between each of the character images I1-In and the sub-data image D11. In some implementations, the difference ratio can be expressed in a percentage form, and the range can be +1.5%, but the present invention is not limited thereto.

In an embodiment of step S73, the processor 120 can perform color-matching on each pixel of the sub-data image with each pixel of each candidate character image filtered out in step S72 according to a correspondence relationship between the positions, so as to confirm whether the color of the pixels at the same position are the same. Herein, the processor 120 can represent the matching result in a percentage.

In an embodiment of step S74, the processor 120 can select the candidate character image whose matching rate is higher than the preset matching rate (e.g., 98.5%) as the character image corresponding to this sub-data image D11, but the value of the preset matching rate is not limited thereto.

In an embodiment of step S70, after the processor 120 obtaining the character image and the representative character corresponding to each of the sub-data images D11-D13, the processor 120 can concatenate the corresponding representative characters in sequence, according to the order of each of the sub-data images D11-D13 in the data image D1, into a representative character string, while the representative character string is the data in the data image D1. Moreover, in the execution of the subsequent step S90, what outputted through the communication device 130 by the processor 120 is the representative character string after completed the concatenating.

In an embodiment of a data capturing method, the processor 120 further backs to step S30 in response to obtaining none of the character images corresponding to any data image from the character image database 110, so as to perform reanalyzing according to a new current image, but the present invention is not limited thereto. In another embodiment, although the processor obtains none of the character images corresponding to a certain data image, for example, when the processor 120 obtained none of the character images corresponding to the data image D1 but obtained the character images corresponding to the data images D2 and D3, the processor 120 still can upload the representative characters corresponding to the data images D2 and D3 to the server 200, and then back to step S30 for performing reanalyzing according to the new current image.

In an embodiment of a data capturing method, in response to obtaining none of the character images corresponding to a certain sub-data image, for example, when the processor 120 obtains none of the character images which is close to the sub-data image D13 in step S72, or the processor 120 obtains none of the character images whose matching rate is higher than the preset matching rate in step S74, the processor 120 can further store the sub-data image D13, such as in the storage 150, so that the user can identify it in a manner of human eye recognition in a later. Moreover, the user can further add the sub-data image D13 as a new character image into the character image database 110 for expanding the character image database 110.

In some embodiments, the character image database 110 can be a local database and located in the same device as the processor 120, but the present invention is not limited thereto. In other embodiments, the character image database 110 can also be a cloud database which is connected to the processor 120 through a remote connection and located in the different device from the processor 120.

As described above, embodiments of the present invention provide a data capturing system and method thereof, which obtain a current image of target software window through a handle of the target software window such that the data capturing and the operation of other software windows can be performed simultaneously without being affected by the other software windows blocked in front of the target software window, thereby increasing the operating efficiency. Furthermore, embodiments of the present invention obtain corresponding representative character(s) by the matching comparison between the sub-data image and the character images in the character image database, instead of adopting an optical character recognition (OCR) software which is more expensive and occupies more software resources, thereby can further reducing the cost and the required software resources.

The features of the embodiments described above make persons having ordinary skill in the art can clearly appreciate the form of the present specification. Persons having ordinary skill in the art can appreciate that the objectives and/or the advantages of the above embodiments can be accomplished in consistent with the above embodiments by designing or modifying other processes and structures based on the content of the present disclosure. Persons having ordinary skill in the art can also appreciate that the equivalent constructions without departing from the scope and spirit of the present invention can be modified, substituted or retouched without departing from the scope and spirit of the present invention.

What is claimed is:

1. A data capturing method, comprising:
   filtering out a target software window having a selected window title from a plurality of software windows according to the selected window title;
   obtaining a current image of the target software window according to a handle of the target software window, wherein the handle corresponds to the selected window title;
   capturing at least one data image from the current image according to at least one target capture area;
   obtaining at least one corresponding character image and at least one corresponding representative character from a character image database according to the at least one data image; and
   outputting the at least one representative character corresponding to the at least one data image.

2. The data capturing method as claimed in claim 1, wherein the at least one data image comprises at least one character to be tested, and the at least one character to be tested is arranged in a single row.

3. The data capturing method as claimed in claim 1, wherein the step of obtaining the at least one corresponding character image and the at least one corresponding representative character from the data image database according to the at least one data image further comprises:
   cutting the at least one data image into at least one sub-data image;
   obtaining a plurality of candidate character images from the character image database according to the at least one sub-data image;
   matching the at least one sub-data image with the corresponding plurality of candidate character images;
   selecting the candidate character image whose matching rate with the at least one sub-data image is greater than a preset matching rate as the at least one character image corresponding to the at least one sub-data image; and
   obtaining the at least one representative character corresponding to the at least one character image of the at least one sub-data image.

4. The data capturing method as claimed in claim 3, wherein the step of obtaining the plurality of candidate character images from the character image database according to the at least one sub-data image further comprises:
   calculating a first pixel number of the at least one sub-data image, wherein the first pixel number is the amount of pixels having a first color in the at least one sub-data image;
   comparing the first pixel number with a second pixel number of each of the character images in the character image database, wherein the second pixel number is the amount of pixels having the first color in each of the character images; and
   selecting the character images whose difference ratio between the first pixel number and the second pixel number falls within a range as the candidate character images.

5. The data capturing method as claimed in claim 3, wherein the step of matching the at least one sub-data image with the corresponding plurality of candidate character images includes matching color of each pixel in the at least one sub-data image with color of each pixel located at a corresponding position in each of the candidate character images.

6. The data capturing method as claimed in claim 1, further comprising: in response to obtaining none of the character images corresponding to the at least one data image from the character image database, returning to execute the step of obtaining the current image of the target software window according to the handle of the target software window.

7. The data capturing method as claimed in claim 1, wherein the at least one data image comprises at least one character to be tested, and before the step of obtaining the at least one character image corresponding to the at least one data image and the at least one representative character corresponding to the at least one character image from the character image database according to the at least one data image, the method further comprises:
   identifying color of a plurality of pixels in the at least one data image;
   determining the pixels having the same color and occupying more than a preset proportion in the at least one data image to be a plurality of background pixels;
   replacing color of a plurality of non-background pixels which are not the background pixels in the plurality of pixels with a first color, and replacing color of the background pixels with a second color, wherein the non-background pixels are used to display the at least one character to be tested; and
   adjusting number of columns of the background pixels which are adjacent to the non-background pixels in a row direction according to the non-background pixels of the at least one character to be tested.

8. The data capturing method as claimed in claim 7, wherein after executing the step of adjusting the number of columns of the background pixels which are adjacent to the non-background pixels in the row direction according to the non-background pixels of the at least one character to be tested, a total number of the columns of the non-background pixels of the each character to be tested and columns of the adjacent background pixels is equal to a first preset column number.

9. The data capturing method as claimed in claim 7, wherein after executing the step of adjusting the number of columns of the background pixels which are adjacent to the non-background pixels in the row direction according to the non-background pixels of the at least one character to be tested, the non-background pixels of the each character to be tested and the non-background pixels of the adjacent character to be tested are separated by the background pixels having a second preset column number in the row direction.

10. The data capturing method as claimed in claim 1, wherein the current image of the target software window is an image of the whole target software window.

11. A data capturing system, comprising:
    a character image database, configured to store a plurality of character images;
    a processor, configured to filter out a target software window having a selected window title from a plurality of software windows according to the selected window title, obtain a current image of the target software window according to a handle of the target software window, capture at least one data image from the current image according to at least one target capture area, and obtain at least one corresponding character image and at least one corresponding representative character from the character image database according to the at least one data image, wherein the handle corresponds to the selected window title; and a communication device, configured to output the at least one representative character corresponding to the at least one data image.

12. The data capturing system as claimed in claim 11, wherein the at least one data image comprises at least one character to be tested, and the at least one character to be tested is arranged in a single row.

13. The data capturing system as claimed in claim 11, wherein the processor further cuts the at least one data image into at least one sub-data image, obtains a plurality of candidate character images from the character image database according to the at least one sub-data image, matches the at least one sub-data image with the corresponding plurality of candidate character images, selects the candidate character image whose matching rate with the at least one sub-data image is greater than a preset matching rate as the at least one character image corresponding to the at least one sub-data image, and obtains the at least one representative character of the at least one character image corresponding to the at least one sub-data image.

14. The data capturing system as claimed in claim 13, wherein the processor further calculates a first pixel number of the at least one sub-data image, compares the first pixel number with a second pixel number of each of the character images in the character image database, and selects the character images whose difference ratio between the first pixel number and the second pixel number falls within a range as the candidate character images, wherein the first pixel number is the amount of pixels having a first color in the at least one sub-data image, and the second pixel number is the amount of pixels having the first color in the each of the character images.

15. The data capturing system as claimed in claim 13, wherein the processor matches the color of each pixel in the at least one sub-data image with the color of each pixel located at a corresponding position in each of the candidate character images.

16. The data capturing system as claimed in claim 11, wherein in response to obtaining none of the character images corresponding to the at least one data image from the character image database, the processor obtains the current image of the target software window according to the handle of the target software window once again.

17. The data capturing system as claimed in claim 11, wherein the at least one data image comprises at least one character to be tested, the processor further identifies the color of a plurality of pixels in the at least one data image, determines the pixels having the same color and occupying more than a preset proportion in the at least one data image to be a plurality of background pixels, replaces the color of a plurality of non-background pixels which are not the background pixels in the plurality of pixels with a first color, and replaces the color of the background pixels with a second color, wherein the non-background pixels are used to display the at least one character to be tested, and the processor further adjusts the number of columns of the background pixels which are adjacent to the non-background pixels in a row direction according to the non-background pixels of the at least one character to be tested.

18. The data capturing system as claimed in claim 17, wherein after the processor adjusts the number of columns of the background pixels which are adjacent to the non-background pixels in the row direction according to the non-background pixels of the at least one character to be tested, a total number of the columns of the non-background pixels of the each character to be tested and columns of the adjacent background pixels is equal to a first preset column number.

19. The data capturing system as claimed in claim 17, wherein after the processor adjusts the number of columns of the background pixels which are adjacent to the non-background pixels in the row direction according to the non-background pixels of the at least one character to be tested, the non-background pixels of the each character to be tested and the non-background pixels of the adjacent character to be tested are separated by the background pixels having a second preset column number in the row direction.

20. The data capturing system as claimed in claim 11, wherein the current image of the target software window is an image of the whole target software window.

* * * * *